US011993983B2

(12) United States Patent
Takahashi et al.

(10) Patent No.: US 11,993,983 B2
(45) Date of Patent: May 28, 2024

(54) RESTRICTION MECHANISM FOR SUSPENDED SLIDING DOOR DEVICE

(71) Applicant: TOK, INC., Tokyo (JP)

(72) Inventors: Daisuke Takahashi, Tokyo (JP); Shota Muroi, Tokyo (JP)

(73) Assignee: TOK, INC., Tokyo (JP)

( * ) Notice: Subject to any disclaimer, the term of this patent is extended or adjusted under 35 U.S.C. 154(b) by 0 days.

(21) Appl. No.: 17/693,388

(22) Filed: Mar. 13, 2022

(65) Prior Publication Data

US 2022/0195798 A1 Jun. 23, 2022

Related U.S. Application Data

(62) Division of application No. 16/639,044, filed as application No. PCT/JP2017/032022 on Sep. 6, 2017, now Pat. No. 11,512,531.

(51) Int. Cl.
*E06B 9/80* (2006.01)
*E05F 5/00* (2017.01)

(52) U.S. Cl.
CPC ................ *E06B 9/80* (2013.01); *E05F 5/003* (2013.01); *E06B 2009/801* (2013.01)

(58) Field of Classification Search
CPC ............ E05F 15/635; E05F 11/54; E06B 3/46
(Continued)

(56) References Cited

U.S. PATENT DOCUMENTS 1,038,938 A * 9/1912 Murphy .................... E06B 9/04 49/370
1,355,874 A * 10/1920 Wheeler .............. B61D 19/002 49/362
(Continued)

FOREIGN PATENT DOCUMENTS

JP H0593487 4/1993
JP H11280336 10/1999
(Continued)

OTHER PUBLICATIONS

U.S. Appl. No. 16/639,044, filed Feb. 13, 2020, Takahashi et al.
International Search Report for corresponding International Application No. PCT/JP2017/032022, dated Nov. 7, 2017; 2 pages.

*Primary Examiner* — Abe Massad
*Assistant Examiner* — Matthew R. Shepherd
(74) *Attorney, Agent, or Firm* — Fattibene and Fattibene, LLC; Paul A. Fattibene

(57) ABSTRACT

An opening/closing direction restriction mechanism for a manual shutter device and an opening/closing direction restriction mechanism for a suspended sliding door device. This opening/closing direction restriction mechanism is provided with: a flange fixedly mounted on a fixed shaft; a bracket which is loosely fitted to the fixed shaft and can be integrally rotated with a winding member; and a two-way clutch which can be switched between a reverse rotation inhibited state in which the revolution of a planetary external gear along a winding direction of the winding member is allowed and the revolution of the planetary external gear along an unwinding direction is inhibited, and a forward rotation inhibited state in which the revolution of the planetary external gear along the winding direction of the winding member is inhibited and the revolution of the planetary external gear along the unwinding direction is allowed.

3 Claims, 9 Drawing Sheets

(58) Field of Classification Search
USPC ........................... 49/360, 366, 370, 118, 120
See application file for complete search history.

(56) References Cited

U.S. PATENT DOCUMENTS

| | | | | | |
|---|---|---|---|---|---|
| 3,074,124 | A * | 1/1963 | Bergstedt | E05D 15/063<br>312/333 |
| 4,222,601 | A | 9/1980 | White | 160/306 |
| 4,513,805 | A | 4/1985 | Mase | 160/299 |
| 4,681,279 | A | 7/1987 | Nakamura | 160/294 |
| 5,586,631 | A | 12/1996 | Benthin | 160/297 |
| 6,155,328 | A | 12/2000 | Welfonder | 160/296 |
| 6,340,073 | B1 * | 1/2002 | Lee | B66B 13/20<br>187/319 |
| 8,272,167 | B2 * | 9/2012 | Sato | E05F 5/003<br>49/404 |
| 8,807,196 | B2 | 8/2014 | Mullet | 160/317 |
| 2004/0099384 | A1 | 5/2004 | Wu | 160/321 |
| 2006/0068962 | A1 | 3/2006 | Allsopp | 475/182 |
| 2007/0084570 | A1 | 4/2007 | Lin | 160/321 |
| 2008/0053626 | A1 | 3/2008 | Jarosinski et al. | 160/168.1 |
| 2009/0288347 | A1 | 11/2009 | Takahashi | 49/413 |
| 2010/0126073 | A1 * | 5/2010 | Schroeder | F16C 29/045<br>49/118 |
| 2010/0219306 | A1 | 9/2010 | Detmer | 248/201 |
| 2015/0211605 | A1 | 7/2015 | Yen | 475/331 |
| 2015/0308188 | A1 | 10/2015 | Lin | 242/375.3 |
| 2015/0330144 | A1 | 11/2015 | Jung | 475/4 |
| 2018/0087302 | A1 * | 3/2018 | Hegner | E06B 3/4636 |

FOREIGN PATENT DOCUMENTS

| | | | | | |
|---|---|---|---|---|---|
| JP | 2003082922 | | | 3/2003 | |
| JP | 2003082922 | A | * | 3/2003 | |
| JP | 4281069 | B2 | * | 6/2009 | |
| JP | 2010001726 | | | 1/2010 | |
| JP | 2010024752 | | | 2/2010 | |
| JP | 2012225054 | A | * | 11/2012 | E05F 1/16 |
| JP | 2014214475 | A | * | 11/2014 | E05F 17/00 |
| KR | 101642013 | B1 | * | 7/2016 | |

* cited by examiner

Fig. 7A
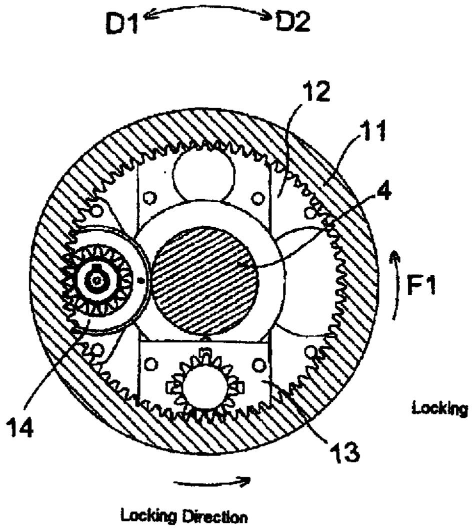
Fig. 7B
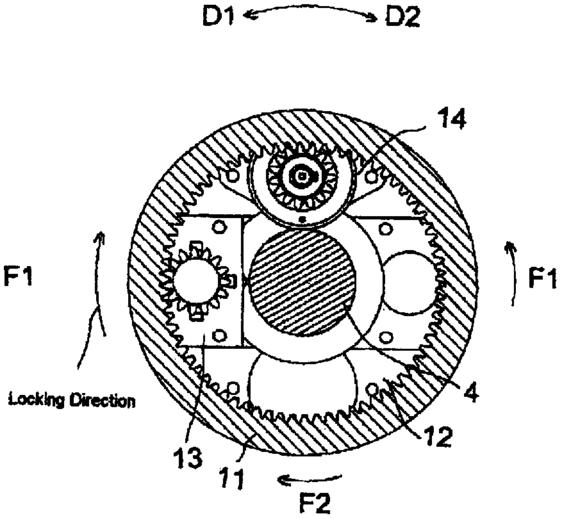
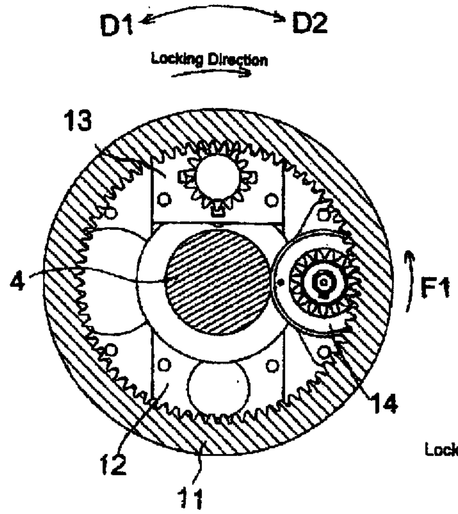
Fig. 7C
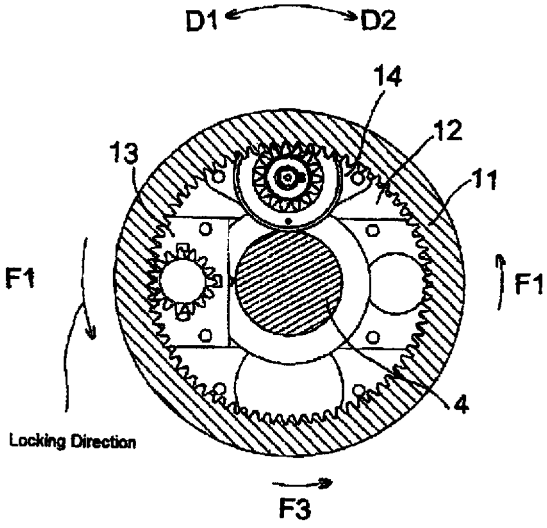
Fig. 7D

RESTRICTION MECHANISM FOR SUSPENDED SLIDING DOOR DEVICE

RELATED APPLICATIONS

This application is a divisional of U.S. application Ser. No. 16/639,044 filed Feb. 13, 2020, which is the National Stage of International Application No. PCT/JP2017/032022 filed Sep. 6, 2017, all of which are herein incorporated by reference.

TECHNICAL FIELD

The present invention relates to a direction restriction mechanism tension device for restricting a rotating direction of a winding member used in a shutter device in which the rotationally driven winding member vertically moves a slat and a direction restriction mechanism for restricting a slide direction of a suspended sliding door.

BACKGROUND ART

In the past, a shutter device which opens/closes an entry door of a building and a suspended sliding door device which opens/closes the entrance of a room are known. Patent Literature 1 related to an electric shutter discloses an electric shutter in which slat is wound on a winding shaft by rotatably driving a wind-up shaft by an electric motor. The rotation of the winding shaft is controlled by a rotating direction and an ON/OFF operation of the electric motor input through an operation switch so that the slat comes to be stopped at an arbitrary position.

Patent Literature 2 related to a manual shutter discloses a manual shutter in which a torsion spring wound on a fixed shaft provides a torque in a winding direction in which a slat is wound on a wind-up shaft. In this manner, when a user slightly lifts up the slat, the torque of the torsion spring winds up the entire slat.

Patent Literature 3 related to a suspended sliding door device discloses an automatic opening/closing device for a sliding door in which a pinion directly coupled to an output shaft of an electric motor is meshed with a rack disposed on an upper side surface of a door, and the door moves in an opening direction when the electric motor drives to rotate the pinion in the forward direction, and the door moves in a closing direction when the pinion rotates in the reverse direction.

CONVENTIONAL ART LITERATURE

Patent Literature

Patent Literature 1: Japanese Published Unexamined Application No. 2010-24752

Patent Literature 2: Japanese Published Unexamined Application No. 5-93487

Patent Literature 3: Japanese Published Unexamined Application No. 11-280336

SUMMARY OF THE INVENTION

Problem to be Solved by the Invention

However, in the electric shutter described in Patent Literature 1, the motor shaft of the electric motor must be coupled to the winding shaft or the operation switch of the electric motor must be disposed, so that the structure of the electric shutter becomes complex and the installation cost of the electric shutter tends to be disadvantageously high.

In the manual shutter described in Patent Literature 2, since any one of a fully-open state in which all the slat is wound up and a totally-closed state in which all the slat falls down has to be selected, the slat cannot be stopped at an arbitrary position.

In the automatic opening/closing device for a sliding door described in Patent Literature 3, since the door is opened and closed by the electric motor to make the structure of the opening/closing device complex, an installation cost of the sliding door tends to be disadvantageously high.

Thus, technical problems to be solved are to provide, at low costs, a mechanism for positioning a winding member relatively moving with respect to fixed members such as a fixed shaft and a suspended rail and an operation member such as a sliding door at a desired position are posed, and the object of the present invention is to provide a solution to the problems.

Means for Solving the Problem

The present invention has been made to achieve the above object, and the invention described in an embodiment provides an opening/closing direction restriction mechanism for a manual shutter device which is configured by a fixed shaft substantially horizontally extended, a winding member rotatably disposed on the fixed shaft to wind a slat, and a torsion spring disposed inside the winding member to bias the winding member in a winding direction which winds the slat including a bracket attached to one of the winding member and the fixed shaft, a flange disposed adjacent to the bracket and attached to the other of the winding member and the fixed shaft, and a two-way clutch disposed on an opposing surface facing the flange of the bracket, wherein a gear formed on the flange and an external gear for clutch disposed on an input shaft of the two-way clutch are engageably disposed, the two-way clutch is disposed such that a reverse rotation inhibited state in which the external gear for clutch is allowed to be rotated along a winding direction of the winding member and the external gear for clutch is inhibited from being rotated along an unwinding direction and a forward rotation inhibited state in which the external gear for clutch is inhibited from being rotated in the winding direction of the winding member and the external gear for clutch is allowed to be rotated along the unwinding direction can be switched.

According to the configuration, external force is given to the winding member in a direction in which the two-way clutch allows the rotation to rotate the external gear for clutch around the input shaft, and the winding member and the bracket or the flange attached to the winding member is rotated around the fixed shaft to make it possible to vertically move the slat. On the other hand, when external force is given to the winding member in a direction in which the two-way clutch prevents the rotation, the external gear for clutch is inhibited from being rotated around the input shaft, and the winding member and the bracket or the flange attached to the winding member are inhibited from being rotated around the fixed shaft, so that the slat is inhibited from being vertically moved. Since the rotating direction of the external gear for clutch allowed by the two-way clutch, i.e., the reverse rotation inhibited state and the forward rotation inhibited state of the two-way clutch can be arbitrarily switched, the slat can be stopped during either the upward movement or the downward movement of the slat.

The invention described in another embodiment, in addition to the configuration of the invention described in a previous embodiment, provides an opening/closing direction restriction mechanism for a manual shutter wherein the bracket is formed in a cylindrical shape, externally fitted on the fixed shaft, and rotatably disposed integrally with the winding member, and the flange is fixed to the fixed shaft.

According to the configuration, when external force is given to the winding member in a direction in which the two-way clutch allows the rotation, the bracket and the winding member rotate around the fixed shaft, so that the slat can be moved upward. On the other hand, when external force is given to the winding member in a direction in which the two-way clutch prevents the rotation, the bracket and the winding member are inhibited from being rotated around the fixed shaft, so that the slat is inhibited from being moved upward.

The invention described in another embodiment, in addition to the configuration described in previous embodiments, provides an opening/closing direction restriction mechanism for a manual shutter wherein the gear is an internal gear formed on an opposing surface of the flange facing the bracket.

According to the configuration, when external force is given to the winding member in a direction in which the two-way clutch allows the rotation, the external gear for clutch is meshed with the internal gear and revolves around the fixed shaft to rotate the winding member around the fixed shaft, so that the slat can be moved upward. On the other hand, when external force is given to the winding member in a direction in which the two-way clutch prevents the rotation, the external gear for clutch is inhibited from being revolved around the fixed shaft to prevent the external gear for clutch from being rotated around the fixed shaft, so that the slat is inhibited from being moved upward.

The invention described in another embodiment, in addition to the configuration of the invention described in previous embodiments, provides an opening/closing direction restriction mechanism for a manual shutter device including a rotating damper disposed on an opposing surface of the bracket and having an external gear for damper which can be meshed with the gear.

According to the configuration, since the rotating damper brakes rotation of the winding member input to the rotating damper through the flange and the external gear for damper, the slat can be silently vertically moved.

The invention described in another embodiment, in addition to the configuration of the invention described in a previous embodiment, provides an opening/closing direction restriction mechanism for manual shutter device wherein the rotating damper is an infinite angle rotating damper which decelerates the winding member when the winding member rotates in a winding direction.

According to the configuration, since the rotating damper brakes rotation of the winding member when the slat moves upward to suppress the winding member from being excessively accelerated and rotated in the winding direction, the slat can be silently and safely moved upward.

The invention described in another embodiment, in addition to the configuration of the invention described in previous embodiments, provides an opening/closing direction restriction mechanism for a manual shutter device wherein the two-way clutch and the rotating damper are disposed on a coaxial circle around the fixed shaft.

According to the configuration, since the external gear for clutch of the two-way clutch and the external gear for damper of the rotating damper are interlocked with each other through the gear of the flange, the opening/closing direction restriction mechanism can be installed in a small space.

The invention described in another embodiment provides an opening/closing direction restriction mechanism for a suspended sliding device in which a suspended door suspended on a suspending rail and a liner which can run on the suspending rail is disposed on the suspended door, the suspended rail is extended by slanting to come down in a closing direction in which the suspended sliding door is closed, wherein a base member is fixed to an upper end of the sliding door which the weight in the closing directions acts, a two-way clutch is disposed on an opposing surface of the base member facing the suspending rail, a rack formed on the suspending rail and a pinion for clutch disposed on an input shaft of the two-way clutch are engageably disposed, the two-way clutch is disposed such that an opening inhibited state in which the pinion for clutch is allowed to be rotated depending on sliding of the suspended sliding door in a closing direction to prevent the pinion for clutch from being rotated depending on sliding of the suspended sliding door in an opening direction and a closing inhibited state in which the pinion for clutch is inhibited from being rotated depending on sliding of the suspended sliding door in the closing direction to allow the pinion for clutch to be rotated depending on sliding of the suspended sliding door in the opening direction can be switched.

According to the configuration, when external force is given to the suspended sliding door in a direction in which the two-way clutch allows the rotation, the pinion for clutch of the two-way clutch proceeds while being meshed with the rack of the suspended rail, the suspended sliding door can be opened/closed. On the other hand, when external force is given to the suspended sliding door in a direction in which the two-way clutch prevents the rotation, the pinion for clutch is inhibited from being rotated to prevent the suspended sliding door from being relatively slid with respect to the suspending rail, so that the suspended sliding door is inhibited from being slid. In addition, since rotating directions of the pinion for clutch allowed by the two-way clutch, i.e., the opening inhibited state and the closing inhibited state of the two-way clutch can be arbitrarily switched, the suspended sliding door can be stopped even in either an opening operation or a closing operation.

The invention described in another embodiment, in addition to the configuration of the invention described in a previous embodiment, provides an opening/closing direction restriction mechanism for a suspended sliding door device including a rotating damper having a pinion for damper which can be meshed with the rack and disposed on an opposing surface of the base member.

According to the configuration, the rotating damper brakes sliding of the base member and the suspended sliding door input to the rotating damper through the suspending rail and the pinion for damper, the suspended sliding door can be silently opened/closed.

The invention described in another embodiment, in addition to the configuration of the invention described in a previous embodiment, provides an opening/closing direction restriction mechanism for a suspended sliding door device wherein the rotating damper is an infinite angle rotating damper which decelerates the suspended sliding door when the suspended sliding door slides in a closing direction.

According to the configuration, since the rotating damper brakes sliding of the suspended sliding door during a closing operation of the suspended sliding door to suppress the suspended sliding door from being excessively accelerated in the closing direction, the suspended sliding door can be silently and safely closed.

Advantages

According to the opening/closing direction restriction mechanism for a manual shutter according to the present invention, when external force is given to the winding member in a direction in which the two-way clutch allows the rotation, the external gear for clutch rotates around the input shaft, and the winding member and the bracket or the flange attached to the winding member, so that the slat can be vertically moved. On the other hand, when external force is given to the winding member in a direction in which the two-way clutch prevents the rotation, the external gear for clutch is inhibited from being rotated around the input shaft, and the winding member and the bracket or the flange attached to the winding member are inhibited from being rotated around the fixed shaft, so that the slat is inhibited from being vertically moved. In addition, since rotating directions of the external gear for clutch allowed by the two-way clutch, i.e., the reverse rotation inhibited state and the forward rotation inhibited state of the two-way clutch can be arbitrarily switched, the slat can be stopped even in the middle of either upward movement or downward movement of the slat.

According to the opening/closing direction restriction mechanism for a suspended sliding door according to the present invention, when external force is given to the suspended sliding door in a direction in which the two-way clutch allows the rotation, the pinion for clutch of the two-way clutch proceeds while being meshed with the rack of the suspending rail to proceed, so that the suspended sliding door can be opened/closed. On the other hand, when external force is given to the suspended sliding door in a direction in which the two-way clutch prevents the rotation, the pinion for clutch is inhibited from being rotated to prevent the suspended sliding door from being relatively slid with respect to the suspending rail, so that the suspended sliding door is inhibited from being slid. In addition, since rotating directions of the allowed pinion for clutch, i.e., the opening inhibited state and the closing inhibited state of the two-way clutch can be arbitrarily switched, the suspended sliding door can be stopped even in either an opening operation or a closing operation of the suspended sliding door.

BRIEF DESCRIPTION OF THE DRAWINGS

FIGS. 7A to 7D are pattern diagrams showing an operation of the opening/closing direction restriction mechanism in FIG. 6.

MODES FOR CARRYING OUT THE INVENTION

Figure 1:
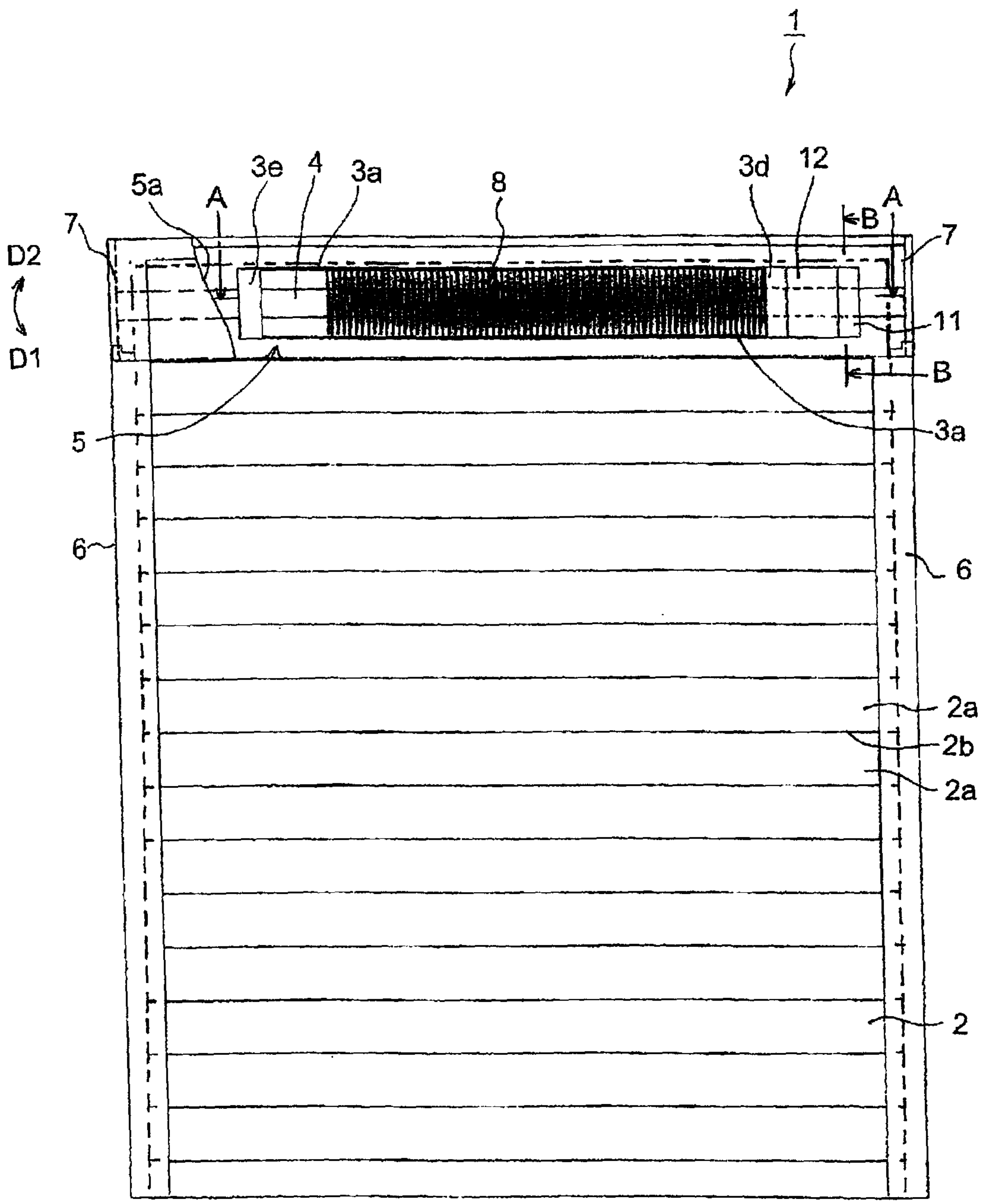
FIG. 1 is a partially cutaway front view showing a manual shutter device to which an opening/closing direction restriction mechanism according to an embodiment of the present invention is applied.

An opening/closing direction restriction mechanism for a manual shutter device according to the present invention which, in order to provide, at a low cost, a mechanism which positions a winding member rotated relatively to a fixed shaft at a desired position, is configured by the fixed shaft substantially horizontally extended, the winding member rotatably disposed on the fixed shaft to wind a slat, and a torsion spring disposed inside the winding member to bias the winding member in a winding direction in which the slat is wound, including a bracket attached to one of the winding member and the fixed shaft, a flange disposed adjacent to the bracket and attached to the other of the winding member and the fixed shaft, and a two-way clutch disposed on an opposing surface of the bracket facing the flange, is produced such that a gear formed on the flange and an external gear for clutch disposed on an input shaft of the two-way clutch are engageably disposed, and the two-way clutch is disposed such that a reverse rotation inhibited state in which the external gear for clutch is allowed to be rotated along a winding direction of the winding member and the external gear for clutch is inhibited from being rotated along an unwinding direction and a forward rotation inhibited state in which the external gear for clutch is inhibited from being rotated in the winding direction of the winding member and the external gear for clutch is allowed to be rotated along the unwinding direction can be switched.

An opening/closing direction restriction mechanism for a suspended sliding door according to the present invention which, in order to provide, at a low cost a mechanism which positions the suspended sliding door sliding relatively to a suspending rail at a desired position, is configured by suspending the suspended sliding door from the suspending rail and disposing a liner which can run on the suspending rail on the sliding door, the suspended rail is extended by slanting to come down in a closing direction in which the suspended sliding door is closed, is produced such that a base member is fixed to an upper end of the suspended sliding door which the weight in the closing direction acts, a two-way clutch is disposed on an opposing surface of the base member facing the suspending rail, the rack formed on the suspended rail and a pinion for clutch fixed to an input shaft of the two-way clutch are engageably disposed, and the two-way clutch is disposed such that an opening inhibited state in which the pinion for clutch is allowed to be rotated depending on sliding of the suspended sliding door in a closing direction to prevent the pinion for clutch from being rotated depending on sliding of the suspended sliding door in an opening direction and a closing inhibited state in which the pinion for clutch is inhibited from being rotated depending on sliding of the suspended sliding door in the closing direction to allow the pinion for clutch to be rotated depending on sliding of the suspended sliding door in the opening direction can be switched.

Embodiment

A shutter device 1 according to an embodiment of the present invention will be described below with reference to the accompanying drawings. In the following embodiment, when the numbers, numerical values, quantities, ranges, and the like of constituent elements are mentioned, unless otherwise specified or except that the numbers are limited to theoretically clear numbers, the numbers are not specific numbers and may be larger or less than the specific numbers.

When the shapes and positional relationships of the constituent elements are mentioned, unless otherwise specified or unless it is obviously not possible in principle, the shapes and the like substantially include approximate or similar ones or the like.

In the drawings, a characteristic part may be exaggerated by enlargement or the like to make the characteristic feature understandable, the sizes, proportions, and the like of the constituent elements are not always the same as the actual ones.

Figure 2:
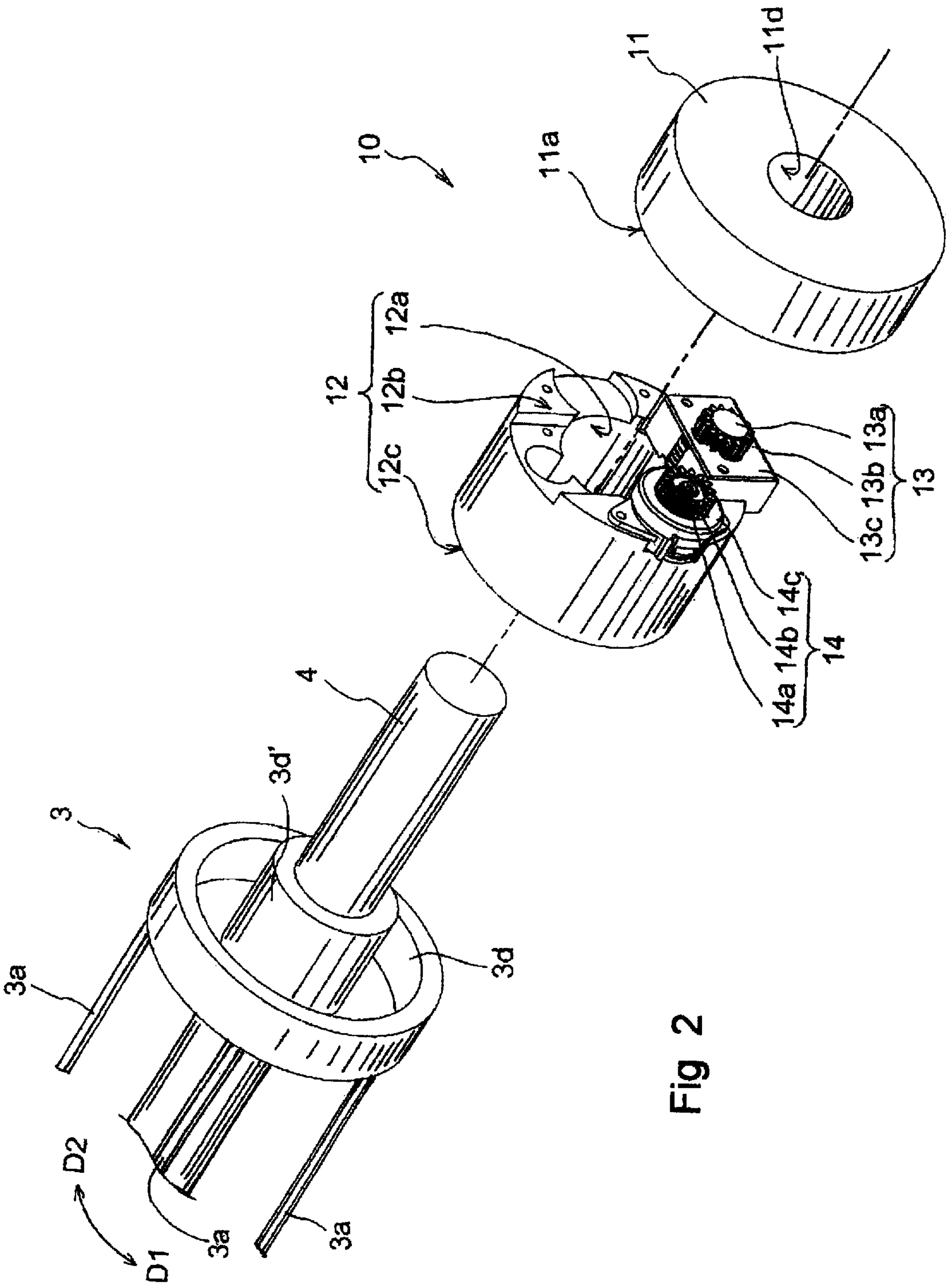
FIG. 2 is an exploded perspective view showing the opening/closing direction restriction mechanism.
Figure 3:
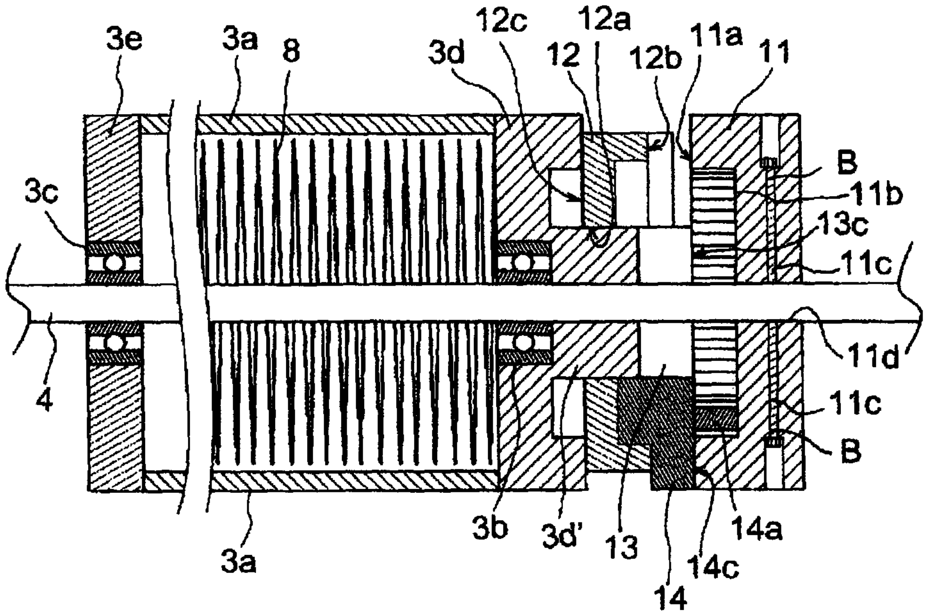
FIG. 3 is a partially schematic sectional view along an A-A line in FIG. 1.
Figure 4:
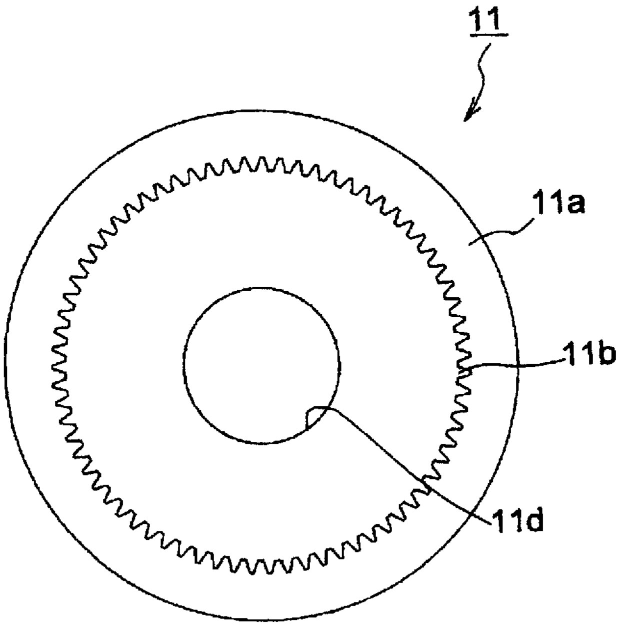
FIG. 4 is a left side view showing a flange in FIG. 2.
Figure 5:
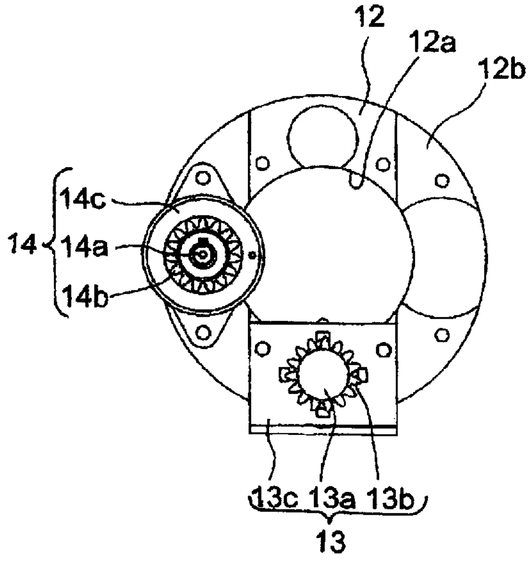
FIG. 5 is a right side view showing a bracket, a two-way clutch, and a rotating damper in FIG. 2.
Figure 6:
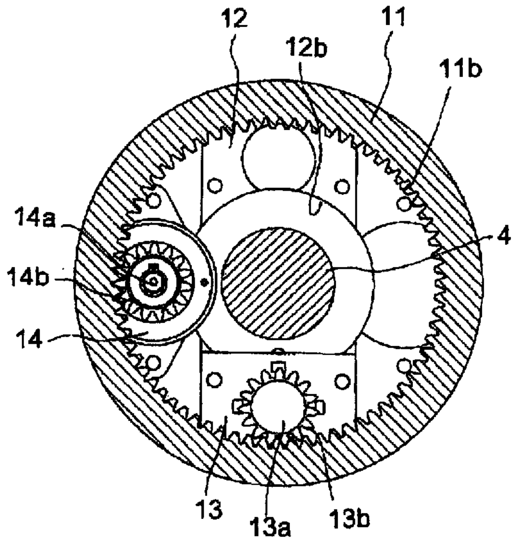
FIG. 6 is a sectional view along a B-B line in FIG. 1.

FIG. 1 is a partially cutaway view showing a manual shutter device 1 to which an opening/closing direction restriction mechanism 10 is applied. FIG. 2 is an exploded perspective view showing the opening/closing direction restriction mechanism 10. FIG. 3 is a partially schematic sectional view along an A-A line in FIG. 1. FIG. 4 is a left side view showing a flange 11 in FIG. 2. FIG. 5 is a right side view showing a bracket 12, a two-way clutch 13, and a rotating damper 14 in FIG. 2. FIG. 6 is a sectional view along a B-B line in FIG. 1.

The shutter device 1 vertically moves a large-area entrance of a garage, a shop, or the like to open or close the entrance. The shutter device 1 includes a slat 2 which can be vertically moved, a winding member 3 winding the slat 2, and a fixed shaft 4 disposed at a center of rotation of the winding member 3. A housing space 5 in which the slat 2, the winding member 3, and the fixed shaft 4 are housed is covered with a housing cover 5*a* and is protected without being exposed to wind and rain.

The slat 2 is configured such that slat members 2*a* disposed vertically adjacent to each other are hinge-coupled to each other through swinging shafts 2*b*. An upper end of the slat 2 is coupled to the winding member 3 and configured to be winded on the outer periphery of the winding member 3. Both the ends of the slat 2 are housed in a sliding groove (not shown) of guide rails 6 upright formed on the left and right so as to suppress instability caused by vertical movement of the slat 2.

The winding member 3 is formed in a substantially cylindrical shape. More specifically, the winding member 3 is configured by four shafts 3*a* horizontally extended, bearings 3*b* and 3*c* press-fitted in the fixed shaft 4, a wheel 3*d* bonded to one end of the shaft 3*a* and externally fitted on the bearing 3*b*, and a wheel 3*e* bonded to the other end of the shaft 3*a* and externally fitted on the bearing 3*c*. In this manner, when the winding member 3 is rotationally driven in a winding direction (opening direction) D1, the slat 2 is winded by the winding member 3 and moves upward. When the winding member 3 is rotationally driven in an unwinding direction (closing direction) D2, the slat 2 is sent out and moves downward. The number of shafts 3*a* is not limited to four, may be 2 to 3 or 5 or more.

The fixed shaft 4 is bridged over shutter brackets 7 disposed on the upper parts of the left and right guide rails, and both the ends of the fixed shaft 4 are fixed and supported on the shutter brackets 7, respectively. A torsion spring (twisted coil spring) 8 is winded on the fixed shaft 4.

The torsion spring 8 is housed in the winding member 3. One end of the torsion spring 8 is fixed to the wheel 3*d*, and the other end is fixed to the fixed shaft 4. The torsion spring 8 is designed to bias the wheel 3*d* in the winding direction D1. In this manner, the slat 2 can be moved upward by slight force.

The structure of the opening/closing direction restriction mechanism 10 will be described below with reference to the accompanying drawings. The opening/closing direction restriction mechanism 10 includes the flange 11 fixed to an end of the fixed shaft 4, the bracket 12 disposed adjacent to the flange 11, and the two-way clutch 13 disposed on a side surface of the bracket 12.

An internal gear 11*b* is formed on an opposing surface 11*a* of the flange 11 facing the bracket 12. The flange 11 is formed in a disk-like shape, and the distal end of a bolt B screwed in a bolt hole 11*c* digs into the fixed shaft 4 to fix the flange 11 to the fixed shaft 4. Reference numeral 11*d* is an insertion hole into which the fixed shaft 4 is inserted.

The bracket 12 is formed in a cylindrical shape, and a small-diameter part 3*d*' of the wheel 3*d* is inserted into a central hole part 12*a*. The two-way clutch 13 is disposed on one side surface 12*b* of the bracket 12 facing the flange 11. The wheel 3*d* is bonded to other side surface 12*c* of the bracket 12. Thus, the bracket 12 is rotated integrally with the winding member 3 through the wheel 3*d*.

A planetary external gear 13*b* for clutch is disposed on the input shaft 13*a* of the two-way clutch 13. The planetary external gear 13*b* for clutch can be meshed with an internal gear 11*b* of the flange 11. When the bracket 12 is rotationally driven relatively to the flange 11, the internal gear 11*b* of the flange 11 and the planetary external gear 13*b* of the two-way clutch 13 are meshed with each other to rotate the input shaft 13*a* of the two-way clutch 13.

The two-way clutch 13 has a known configuration, allows any one of rotation (forward rotation) of the winding member 3 in the winding direction D1 and rotation (reverse rotation) of the winding member 3 in an unwinding direction D2, and restricts the other. Rotating directions (locking directions) restricted by the two-way clutch 13 can be arbitrarily switched by applying external force equal to or higher than a predetermined threshold value in a direction in which the rotation has been restricted. As a driving type for the two-way clutch 13, a friction switching type or an electric switching type is known. Any one of the types may be employed in the present invention. When the former is employed, a two-way clutch can be installed at a low cost.

The opening/closing direction restriction mechanism 10 includes the rotating damper 14. The rotating damper 14 is disposed on the one side surface 12*b* of the bracket 12. A planetary external gear 14*b* which can be meshed with the internal gear 11*b* of the flange 11 is disposed on the input shaft 14*a* of the rotating damper 14. The rotating damper 14 has a known configuration and brakes rotating motion of the input shaft 14*a* input through the planetary external gear 14*b* for damper. The rotating damper 14 is, for example, is an oil damper or the like which brakes rotation of the input shaft 14*a* by viscosity resistance. As the rotating damper 14, at least an infinite rotating damper which decelerates the winding member 3 when the winding member 3 rotates the winding direction D1 is preferable. When a bidirectional infinite rotating damper is employed as the rotating damper 14, vertical movement of the slat 2 is braked to moderately vertically move the slat 2. In addition, when a unidirectional infinite rotating damper is employed as the rotating damper 14, upward movement of the slat 2 is braked to moderately move the slat 2 upward, and the slat 2 can be operated with slight force because force (damping force) braking downward movement of the slat 2 when the slat 2 is moved downward.

The two-way clutch 13 and the rotating damper 14 are arranged on a coaxial circle around the fixed shaft 4 when viewed from the axial direction of the fixed shaft 4. The number of rotating dampers 14 arranged on the opening/closing direction restriction mechanism 10 is not limited to one and may be two or more. When two or more rotating dampers 14 are disposed, the rotating dampers 14 are preferably arranged to sandwich the two-way clutch 13.

A side surface 13*c* of the two-way clutch 13 and a side surface 14*c* of the rotating damper 14 are formed on substantially the same plane when viewed from the radial direction of the fixed shaft 4. In this manner, since displacements of an engagement position between the planetary external gear 13*b* for clutch and the internal gear 11*b* and an engagement position of the planetary external gear 14*b* for damper and the internal gear 11*b* in the axial direction of the fixed shaft 4 are suppressed, the bracket 12 can be rotated substantially at a predetermined position with respect to the flange 11.

The opening/closing direction restriction mechanism 10 is not limited to the above configuration, for example, the flange 11 is disposed to be able to be integrated with the winding member 3, and the bracket 12 may be fixed to the fixed shaft 4. In addition, in place of the internal gear 11*b*, an external gear (not shown) may be made in the outer periphery of the bracket 12, and the external gear may be configured to be meshed with the planetary external gear 13*b* for clutch and the planetary external gear 14*b* for damper.

An operation of the opening/closing direction restriction mechanism 10 will be described below. FIGS. 7A to 7D are partially cutaway front views showing the operation of the opening/closing direction restriction mechanism 10. A case using the two-way clutch 13 of a friction switching type two-way clutch 13 will be exemplified below.

When the slat 2 is wound by the winding member 3, as shown in FIG. 7A, a reverse rotation inhibited state in which the two-way clutch 13 restricts the rotation along the unwinding direction D2 of the winding member 3 is set, and since biasing force F1 of the torsion spring 8 always gives a torque to the winding member 3 in the winding direction D1, the planetary external gear 13*b* for clutch is restricted from being meshed with the internal gear 11*b* to restrict the winding direction 3 from rotational driving in the unwinding direction D2.

As shown in FIG. 7B, in a state in which the slat 2 is wound by the winding member 3, when external force F2 equal to or higher than a predetermined threshold value in the unwinding direction D2 is given to the winding member 3, the reverse rotation inhibited state of the two-way clutch 13 is canceled, the state shifts to a forward rotation inhibited state in which rotation of the winding member 3 in the winding direction D1 is restricted, and the winding member 3 can be rotationally driven in the unwinding direction D2. In this manner, while the planetary external gear 13*b* for clutch of the two-way clutch 13 and the planetary external gear 14*b* for damper of the rotating damper 14 rotate, the two-way clutch 13 and the rotating damper 14 revolve around the fixed shaft 4 along the unwinding direction D2 to make it possible to move the slat 2 downward.

When the slat 2 is stopped at an arbitrary position, external force F2 moving the slat 2 downward is removed at a position at which the slat 2 is desired to be stopped. This is because, as shown in FIG. 7C, a torque caused by the biasing force F1 of the torsion spring 8 in the winding direction D1 acts, and the two-way clutch 13 restricts forward rotation of the winding member 3, so that the slat 2 stops at a position at which the external force F2 is removed.

When the slat 2 is moved downward again in the temporary stop state, since the two-way clutch 13 is set in the forward rotation inhibited state, as long as external force in the unwinding direction D2 is given, the slat 2 can be moved downward again.

When the slat 2 is moved upward in the temporary stop state, as shown in FIG. 7D, when external force F3 equal to or higher than a predetermined threshold value is given in a winding direction D1 of the winding member 3, the forward rotation inhibited state of the two-way clutch 13 is canceled, and the state shifts to the reverse rotation state. After the forward rotation inhibited state of the two-way clutch 13 is canceled, by the biasing force F1 of the torsion spring 8, while the planetary external gear 13*b* for clutch of the two-way clutch 13 and the planetary external gear 14*b* for damper of the rotating damper 14 rotate, the two-way clutch 13 and the rotating damper 14 revolve around the fixed shaft 4 along the winding direction D1, and the winding member 3 is rotationally driven in the winding direction D1 to make it possible to automatically move the slat 2 upward.

The rotating damper 14 suppresses excessive acceleration of the planetary external gear for damper and the winding member 3 by biasing force given to the winding member 3 by the torsion spring 8. For example, when a unidirectional infinite rotating damper braking forward rotation of the winding member 3 is disposed, the upward movement of the slat 2 is buffered, and the slat 2 can be silently moved upward. When a bidirectional infinite rotating damper braking forward rotation and reverse rotation of the winding member 3 is disposed, the vertical movement of the slat 2 is buffered, and the slat 2 can be silently vertically moved.

In this manner, in the opening/closing direction restriction mechanism 10 according to the present invention, external force is given to the winding member 3 in a direction in which the two-way clutch 13 allows the rotation to revolve the planetary external gear 13*b* for clutch around the fixed shaft 4, and the winding member 3 and the bracket 12 rotate around the fixed shaft 4. For this reason, the slat 2 can be vertically moved. On the other hand, when external force is given to the winding member 3 in a direction in which the two-way clutch 13 prevents the rotation, the planetary external gear 13*b* for clutch is inhibited from being revolved around the fixed shaft 4, and the winding member 3 and the bracket 12 are inhibited from being rotated around the fixed shaft 4. For this reason, the slat 2 is inhibited from being vertically moved. Since rotating directions of the planetary external gear 13 for clutch allowed by the two-way clutch 13, i.e., the reverse rotation inhibited state and the forward rotation inhibited state of the two-way clutch 13 can be arbitrarily switched, the slat 2 can be stopped even in the middle of either upward movement or downward movement of the slat 2.

Figure 8:
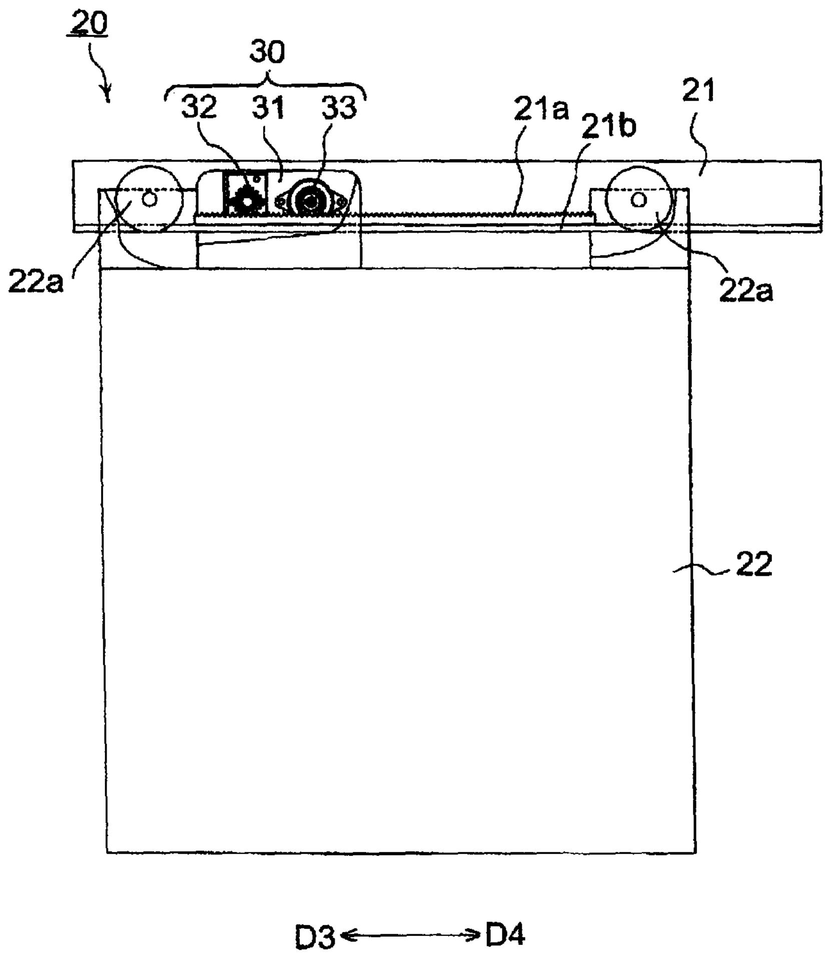
FIG. 8 is a partially cutaway front view showing a suspended sliding door device to which the opening/closing direction restriction mechanism according to an embodiment of the present invention is applied.
Figure 9:
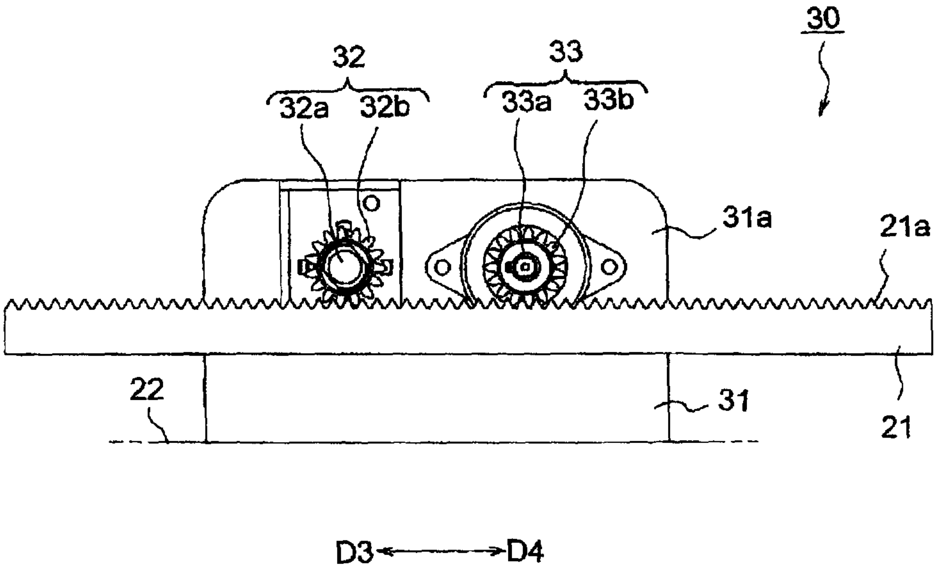
FIG. 9 is an enlarged view showing a main part of the opening/closing direction restriction mechanism.

A suspended sliding door device 20 according to an embodiment of the present invention will be described below with reference to the accompanying drawings. FIG. 8 is a pattern view showing the manual suspended sliding door device 20 to which an opening/closing direction restriction mechanism 30 is applied. FIG. 9 is an enlarged view showing a main part of the opening/closing direction restriction mechanism 30.

The suspended sliding door device 20 slides an entrance door of a house, a hospital room, or the like in the horizontal direction to open the entrance door. The suspended sliding door device 20 includes a suspending rail 21 disposed substantially horizontally and a suspended sliding door 22 suspended from the suspending rail 21.

The suspended rail 21 is disposed on the upper part of the entrance door and extended in the horizontal direction. The suspending rail 21 slants to come down in a closing direction D3 in which the suspended sliding door 22 is closed. A rack 21*a* and a running surface 21*b* are formed on the suspending rail 21.

At the upper left and upper right ends of the suspended sliding door 22, liners 22*a* which can run on a running surface 21*b* of the suspending rail 21 are disposed.

The opening/closing direction restriction mechanism 30 is disposed on the upper part of the suspended sliding door 22. The opening/closing direction restriction mechanism 30 includes a base member disposed on the upper end of the suspended sliding door 22 and a two-way clutch 32 disposed on a side surface of the base member 31.

The base member 31 is formed in a rectangular shape, bonded to the upper end of the suspended sliding door 22, and slides integrally with the suspended sliding door 22.

The two-way clutch 32 is disposed on an opposing surface 31*a* of the base member 31 facing the suspending rail 21. On an input shaft 32*a* of the two-way clutch 32, a pinion 32*b* for clutch which can be engaged with a rack 21*a* of the suspending rail 21 is disposed. When the suspended sliding door 22 and the base member 31 slide relatively to the suspending rail 21, the rack 21*a* of the suspending rail 21 and a pinion 32*b* for clutch of the two-way clutch 32 are meshed with each other, and the input shaft 32*a* of the two-way clutch 32 rotates.

The two-way clutch 32 has a known configuration to allow any one of sliding (closing operation) along a closing direction D3 in which the suspended sliding door 22 is closed and sliding (opening operation) along an opening direction D4 in which the suspended sliding door 22 opens and to restrict the other. Directions (locking direction) of sliding restricted by the two-way clutch 32 can be arbitrarily switched by applying external force equal to or higher than a predetermined threshold value in a direction in which the sliding has been restricted. As a driving type of the two-way clutch 32, a friction switching type or an electric switching type is known. The present invention may employ either the friction switching type or the electric switching type. The former can be installed as a low cost.

The opening/closing direction restriction mechanism 30 further includes a rotating damper 33 which is disposed on the opposing surface 31*a* of the base member 31 and adjacent to the two-way clutch 32. A pinion 33*b* for damper disposed on an input shaft 33*a* of the rotating damper 33 can be meshed with the rack 21*a* of the suspending rail 21. The rotating damper 33 is, for example, an oil damper or the like which brakes the rotation of the input shaft 33*a* by viscosity resistance of oil. The rotating damper 33 may be an infinite rotating damper which decelerates sliding of the suspended sliding door 22 in the closing direction D3. When a bidirectional infinite rotating damper is employed as the rotating damper 33, the opening/closing of the suspended sliding door 22 is braked, and the suspended sliding door 22 is moderately opened/closed. In addition, when a unidirectional infinite rotating damper is employed as the rotating damper 33, a closing operation of the suspended sliding door 22 is braked to moderately close the suspended sliding door 22.

An operation of the opening/closing direction restriction mechanism 30 will be described below. FIGS. 10A to 10D are pattern views showing the operation of the opening/closing direction restriction mechanism 30. An example using a friction switching type two-way clutch 32 will be described below.

Figure 10A:
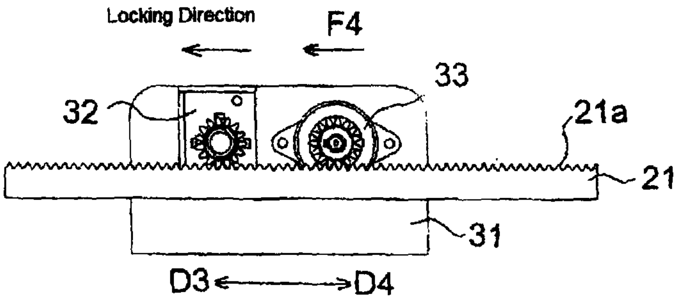
FIGS. 10A to 10D are pattern views showing an operation of the opening/closing direction restriction mechanism in FIG. 9.

In a state in which the suspended sliding door 22 is closed, as shown in FIG. 10A, an opening operation inhibited state in which the two-way clutch 32 restricts sliding of the suspended sliding door 22 in the opening direction D4 is set, and a weight F4 in the closing direction D3 acts on the suspended sliding door 22. The pinion 32*b* for clutch is restricted from being gradually meshed with the rack 21*a*, and the suspended sliding door 22 is restricted from sliding in the opening direction D4.

Figure 10B:
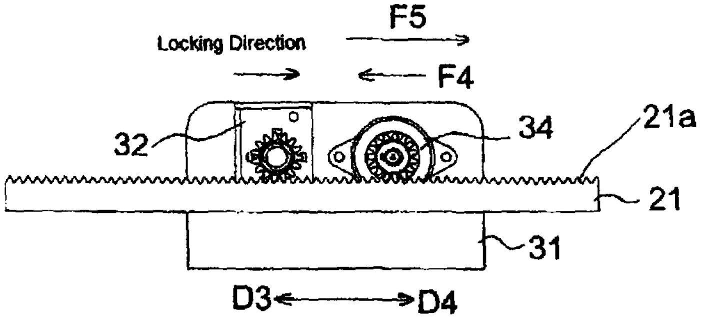

As shown in FIG. 10B, in a state in which the suspended sliding door 22 is closed, when external force equal to or higher than a predetermined threshold value in the opening direction D4 is given to the suspended sliding door 22, the opening operation inhibited state of the two-way clutch 32 is canceled, and the state shifts to a closing operation inhibited state in which sliding of the suspended sliding door 22 in the opening direction D4 to make it possible to slide the suspended sliding door 22 in the opening direction D4. In this manner, the suspended sliding door 22 can be opened.

Figure 10C:
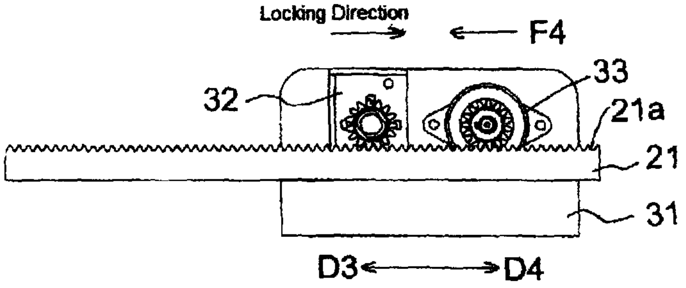

When the suspended sliding door 22 is stopped at an arbitrary position, external force F5 acting on the suspended sliding door 22 is removed at a position at which the suspended sliding door 22 is desired to be stopped. This is because, as shown in FIG. 10C, the weight F4 acts on the suspended sliding door 22, and the two-way clutch 32 restricts the closing operation of the suspended sliding door 22, so that the suspended sliding door 22 stops at a position at which the external force is removed.

When the suspended sliding door 22 is opened again in a temporary stop state, since the two-way clutch 32 is in the closing operation inhibited state, as long as force F in the opening direction D4 is given to the suspended sliding door 22, the suspended sliding door 22 can be opened again.

Figure 10D:
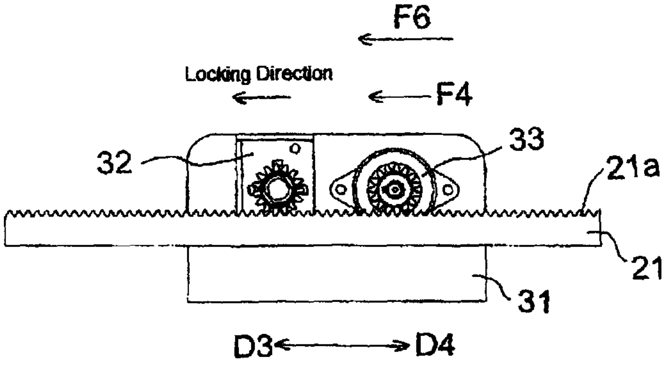

When the suspended sliding door 22 is closed in the temporary stop state, as shown in FIG. 10D, when external force F6 equal to or higher than a predetermined value in the closing direction D3 is given to the suspended sliding door 22, the closing operation inhibited state of the two-way clutch 32 is canceled, and the state shifts to the opening operation inhibited state. After the closing operation inhibited state of the two-way clutch 32 is canceled, the weight F4 of the suspended sliding door 22 makes it possible to automatically slide the suspended sliding door 22 in the closing direction D3.

The rotating damper 33 suppresses excessive acceleration of the suspended sliding door 22. For example, when a unidirectional infinite rotating damper braking sliding of the suspended sliding door 22 in the closing direction D3 is installed, the closing operation of the suspended sliding door 22 is buffered, and the suspended sliding door 22 can be silently closed. In addition, when a bidirectional infinite rotating damper braking sliding of the suspended sliding door 22 in the closing direction D3 and the opening direction D4 is installed, opening/closing of the suspended sliding door 22 is buffered, and the suspended sliding door 22 can be silently opened/closed.

In this manner, in the opening/closing direction restriction mechanism 30 according to the present invention, when external force is given to the suspended sliding door 22 in a direction in which the two-way clutch 32 allows the rotation of the pinion 32*b* for clutch, the pinion 32*b* for clutch of the two-way clutch 32 proceeds while being meshed with the rack 21*a* of the suspending rail 21, so that the suspended sliding door 22 can be opened/closed. On the other hand, when external force is given to the suspended sliding door 22 in a direction in which the two-way clutch 32 prevents the pinion 32*b* for clutch from being rotated, since the suspended sliding door 22 is inhibited from being slid relatively to the suspending rail 21, the suspended sliding door 22 is inhibited from being slid. In addition, since rotating directions of the pinion 32*b* for clutch allowed by the two-way clutch 32, i.e., the opening inhibited state and the closing inhibited state of the two-way clutch 32 can be arbitrarily switched, the suspended sliding door 22 can be stopped even in either the opening operation or the closing operation of the suspended sliding door 22.

The present invention can be variously modified without departing from the spirit and scope of the present invention, and the present invention includes the modified invention as a matter of course.

INDUSTRIAL APPLICABILITY

The present invention can be applied to any configuration in which a functional member moving relatively to a fixed member is positioned at a desired position.

REFERENCE NUMERALS

1 shutter device
2 slat
2*a* slat member
2*b* swinging shaft
3 winding member (functional member)
3*a* shaft
3*b*, 3*c* bearing
3*d*, 3*e* wheel
4 fixed shaft (fixed member)
5 housing space
6 guide rail
7 shutter bracket
8 torsion spring
10 opening/closing direction restriction mechanism (of shutter device)
11 flange
11*a* opposing surface (of flange)
11*b* internal gear
11*c* bolt hole
11*d* insertion hole
12 bracket
12*a* hole part
12*b* one side surface
12*c* other side surface
13 two-way clutch
13*a* input shaft
13*b* planetary external gear for clutch
13*c* side surface (of two-way clutch)
14 rotating damper
14*a* input shaft
14*b* planetary external gear for damper
14*c* side surface (of rotating damper)
20 suspended sliding door device
21 suspending rail (fixed member)
21*a* rack
22 suspended sliding door (functional member)
30 opening/closing direction restriction mechanism (of suspended sliding door device)
31 base member
31*a* opposing surface (of base member)
32 two-way clutch
32*a* input shaft
32*b* pinion for clutch
33 rotating damper
33*a* input shaft
33*b* pinion for damper
D1 winding direction
D2 unwinding direction
D3 closing direction
D4 opening direction

What is claimed is:

1. An opening and closing direction restriction mechanism for a suspended sliding device comprising:

a suspended door suspended on a suspending rail, a liner which can run on the suspending rail, a base member fixed to an upper end of the suspended door in which a weight acts in the closing direction, a two-way clutch is disposed on a surface of the base member facing the suspending rail, a rack formed on the suspending rail and a pinion for the two-way clutch disposed on an input shaft of the two-way clutch are engageably disposed, a rotating damper disposed on the surface of the base member and having a pinion for the rotating damper disposed on an input shaft of the rotating damper which is meshed with the rack wherein, the two-way clutch is disposed such that an opening inhibited state in which the pinion for the two-way clutch is selectively allowed to be rotated depending on sliding of the suspended door in a closing direction to prevent the pinion for the two-way clutch from being rotated depending on sliding of the suspended door in an opening direction opposing the closing direction and a closing inhibited state in which the pinion for the two-way clutch is inhibited from being rotated depending on sliding of the suspended door in the closing direction to allow the pinion for the two-way clutch to be rotated depending on sliding of the suspended door in the opening direction, wherein the opening inhibited state and the closing inhibited state can be switched, and the input shaft of the rotating damper and the input shaft of the two-way clutch are set in parallel.

2. The opening and closing direction restriction mechanism for a suspended sliding door device according to claim 1, wherein:

the rotating damper is an infinite angle rotating damper which decelerates the suspended sliding door when the suspended sliding door slides in the closing direction.

3. The opening and closing direction restriction mechanism for a suspended sliding door device according to claim 1, wherein:

the input shaft of the rotating damper and the input shaft of the two-way clutch both extend perpendicular to a plane of the suspended door and are positioned on the base member adjacent to each other and separated by a distance extending along a length of the rack.

* * * * *